US008620526B2

(12) United States Patent
Schepp et al.

(10) Patent No.: US 8,620,526 B2
(45) Date of Patent: Dec. 31, 2013

(54) METHOD FOR OPERATING A MOTOR VEHICLE AND MOTOR VEHICLE

(75) Inventors: Oliver Schepp, Idstein (DE); Ingobert Lassrich, Trebur (DE); Ali Khanafer, Mainz (DE); Oliver Wagner, Gross-Gerau (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/301,112

(22) Filed: Nov. 21, 2011

(65) Prior Publication Data

US 2012/0136538 A1 May 31, 2012

(30) Foreign Application Priority Data

Nov. 22, 2010 (DE) .......................... 10 2010 052 128

(51) Int. Cl.
*G06F 19/00* (2006.01)
(52) U.S. Cl.
USPC ............. 701/41; 701/43; 180/65.7; 180/65.8; 180/446; 446/429; 446/440; 410/9; 410/16; 410/18; 318/139; 318/539; 297/216.1; 297/216.13; 310/115; 292/201; 292/216
(58) Field of Classification Search
USPC .................... 701/41, 43; 180/65.7, 65.8, 446; 446/429, 440, 498; 410/9, 16, 18; 318/139, 539; 297/216.1, 216.13; 310/115; 292/201, 216
See application file for complete search history.

(56) References Cited

U.S. PATENT DOCUMENTS

| 6,269,307 | B1  |   | 7/2001 | Shinmura et al. |
|-----------|-----|---|--------|-----------------|
| 6,691,018 | B1  | * | 2/2004 | Miyahara ........................ 701/96 |
| 6,750,787 | B2  | * | 6/2004 | Hutchinson .................. 340/942 |
| 7,983,817 | B2  | * | 7/2011 | Breed ............................. 701/45 |
| 8,108,097 | B2  | * | 1/2012 | Mattes et al. .................. 701/36 |
| 8,134,693 | B2  | * | 3/2012 | Ciolli ............................. 356/28 |

(Continued)

FOREIGN PATENT DOCUMENTS

| AT | 414279 B | 10/2000 |
| DE | 102007001117 A1 | 7/2000 |

(Continued)

OTHER PUBLICATIONS

UK IPO, British Search Report for Application No. 1119408.1, dated Mar. 5, 2012.

(Continued)

*Primary Examiner* — Mary Cheung
*Assistant Examiner* — McDieunel Marc
(74) *Attorney, Agent, or Firm* — Ingrassia Fisher & Lorenz, P.C.

(57) ABSTRACT

A method is provided for operating a motor vehicle traveling on a roadway. The method includes, but is not limited to determining data of the roadway in the area, which includes determining a number n of lanes. If it is determined that n≥2, it is determined whether a lane in which the vehicle is located with data of an optical camera of the motor vehicle. In addition, it is determined whether a second motor vehicle is traveling in the lane, in which the motor vehicle is located, in a direction of travel opposite a first direction of travel with a determination apparatus of the motor vehicle. If a second motor vehicle is determined, a warning message and/or automatic actuation is generated from an apparatus of the motor vehicle (e.g, a braking apparatus, a drive apparatus, or a steering apparatus).

21 Claims, 3 Drawing Sheets

(56) References Cited

U.S. PATENT DOCUMENTS

| | | |
|---|---|---|
| 2004/0117091 A1 | 6/2004 | Prakah-Asante et al. |
| 2005/0149251 A1 | 7/2005 | Donath et al. |
| 2008/0021643 A1 | 1/2008 | Nishiyama |
| 2008/0167819 A1* | 7/2008 | Breed ............................ 701/300 |
| 2010/0246889 A1 | 9/2010 | Nara et al. |
| 2011/0121992 A1 | 5/2011 | Konaka et al. |
| 2011/0137535 A1 | 6/2011 | Goto et al. |
| 2012/0323474 A1* | 12/2012 | Breed et al. ................... 701/117 |

FOREIGN PATENT DOCUMENTS

| | | |
|---|---|---|
| DE | 19934774 A1 | 2/2001 |
| DE | 10126548 A1 | 12/2002 |
| DE | 10219904 A1 | 4/2004 |
| DE | 102004057060 A1 | 6/2006 |
| DE | 102008046875 B3 | 3/2010 |
| DE | 102008042825 A1 | 4/2010 |
| DE | 102011103652 A1 | 12/2011 |
| EP | 1840860 A1 | 10/2007 |
| EP | 2060455 A1 | 5/2009 |
| EP | 2164057 A1 | 3/2010 |
| GB | 2431623 A | 5/2007 |
| JP | 2008181328 A | 8/2008 |
| WO | 02097761 A1 | 12/2002 |
| WO | 2011095974 A1 | 8/2011 |

OTHER PUBLICATIONS

UK IPO, British Search Report for Application No. 1119402.4, dated Mar. 9, 2012.
USPTO Non-final Office Action for U.S. Appl. No. 13/301,119, issued Mar. 11, 2013.
Response to Non-final Office Action for U.S. Appl. No. 13/301,119 dated May 24, 2013.
USPTO, Final Office Action for U.S. Appl. No. 13/301,119, issued Jul. 16, 2013.

* cited by examiner

METHOD FOR OPERATING A MOTOR VEHICLE AND MOTOR VEHICLE

CROSS-REFERENCE TO RELATED APPLICATION

This application claims priority to German Patent Application No. 102010052128.0, filed Nov. 22, 2010, which is incorporated herein by reference in its entirety.

TECHNICAL FIELD

The technical field relates to a method for operating a motor vehicle traveling on a roadway in a first direction of travel, a motor vehicle, a computer program product, and a computer-readable medium.

BACKGROUND

Known from DE 10 2008 042 825 A1 is a driver assistance system for motor vehicles that comprises at least one sensor apparatus for detecting and determining the position of objects in the surroundings of the motor vehicle. In addition, the driver assistance system comprises at least one evaluation unit for processing and/or evaluating sensor data and ambient coordinates as well as for transferring to a display apparatus. The evaluation unit comprises means for correcting measurement errors, which use a plurality of sensor data of at least one sensor apparatus in relation to an object in order to determine a coordinate of the object therefrom.

It is at least one object to provide a method for operating a motor vehicle, a motor vehicle, a computer program product, and a computer-readable medium, which enable an increased safety in road traffic. In addition, other objects, desirable features and characteristics will become apparent from the subsequent summary and detailed description, and the appended claims, taken in conjunction with the accompanying drawings and this background.

SUMMARY

A method for operating a first motor vehicle traveling on a roadway in a first direction of travel, according to one aspect of the application, comprises the following steps. Data of the roadway in the area of the first motor vehicle is determined, where the determination of the data includes determining a number n of lanes of the roadway. If it is determined that n≥2, a lane of the roadway in which the first vehicle is located is determined by means of data from at least one optical camera of the first motor vehicle. In addition, it is determined whether a second motor vehicle is traveling in the lane in which the first motor vehicle is located, in a direction of travel opposite the first direction of travel, by means of a first determination apparatus of the first motor vehicle. The first direction of travel and the second direction of travel in this case are relative to a stationary object, for example, to the roadway. If such a second motor vehicle is determined, a warning message is output and/or at least one apparatus of the first motor vehicle is automatically actuated, selected from the group consisting of a braking apparatus, a drive apparatus, and a steering apparatus.

Determining data of the roadway in the area of the first motor vehicle is understood here and subsequently to mean determining data characterizing the roadway in a neighborhood of the first motor vehicle. In particular, this is understood as a determination of the data characterizing the roadway in a partial area of the neighborhood of the motor vehicle, which is disposed ahead of the first motor vehicle in the direction of travel of the first motor vehicle, i.e., in the first direction of travel.

The method for operating the first motor vehicle according to the application allows increased safety in road traffic by determining whether a second motor vehicle is traveling in the lane of the first motor vehicle in the direction opposite the direction of travel and outputting a warning message and/or automatically actuating the at least one apparatus of the first motor vehicle if such a second vehicle is determined. By outputting the warning message, the road users involved can respond in good time to the possible hazardous situation or an automatic braking or evasive procedure of the first motor vehicle can be accomplished by the automatic actuation of the at least one apparatus. The method advantageously has an increased accuracy since the determination of the lane of the roadway in which the first motor vehicle is located is accomplished by means of data of the at least one optical camera of the first motor vehicle and therefore by means of data of a vehicle's own sensor. As a result, the particular instantaneous driving situation can be taken into account to an increased extent and the output of incorrect information can be avoided. It is preferably determined whether the second motor vehicle is located ahead of the first motor vehicle in the first direction of travel, i.e., whether the second motor vehicle is coming toward the first motor vehicle.

In a further embodiment, the number n of lanes of the roadway in the first direction of travel, i.e., the direction travel of the first motor vehicle is determined. The condition n≥2 therefore means in the said embodiment that the roadway has at least two lanes in the first direction of travel. As a result, wrong-way drivers on multilane roadways in one direction of travel, in particular on freeways and/or highways can be advantageously determined and warnings of these can be issued or an automatic evasion can be effected.

In a further embodiment, the determination of data of the roadway in the area of the first motor vehicle is made by means of data of the at least one optical camera and/or by means of map data stored in a storage apparatus. The storage apparatus in this case is typically part of the first motor vehicle, typically a navigation system of the first motor vehicle. The said embodiments have the advantage that the roadway data can be determined very precisely.

The first determination apparatus preferably includes a sensor selected from the group consisting of an electromagnetic sensor, in particular a radar sensor or a lidar sensor, an acoustic sensor, in particular an ultrasound sensor, and the at least one optical camera. The sensors are increasingly used in motor vehicles, with the result that the number of components additionally required for the method is as small as possible.

In a further embodiment, it is additionally determined by means of a second determination apparatus of the first motor vehicle whether a second motor vehicle is traveling in the second direction of travel in the lane in which the first motor vehicle is located. The output of the warning message and/or the automatic actuation of the at least one apparatus of the first motor vehicle is accomplished if a second motor vehicle is determined by means of the first determination apparatus and the second determination apparatus. The said embodiment advantageously enables the data of the first and second determination apparatus to be made mutually plausible, whereby an incorrect determination of a second motor vehicle can be avoided to a further increased degree.

The second determination apparatus preferably includes a sensor selected from the group consisting of an electromagnetic sensor, in particular a radar sensor and a lidar sensor, an acoustic sensor, in particular an ultrasound sensor, and the at least one optical camera. The sensor of the second determination apparatus is thereby different from the sensor of the first determination apparatus.

The warning message is preferably output inside the first motor vehicle. As a result, the occupants of the first motor vehicle, for example, the driver of the first motor vehicle, can be warned of vehicles traveling in the wrong direction of travel in their own lane, in particular vehicles coming toward them. As a result, these have the possibility to react in good time to the possible hazardous situation. The warning message in this case is for example, a visual and/or audible and/or haptic warning message.

Additionally or alternatively, the warning message can be output to the second motor vehicle and/or to other road users. In particular, the warning message can be output by means of automatic actuation of a horn and/or at least one light signal device of the first motor vehicle, for example, at least one headlamp or a warning flasher, and/or by means of a vehicle-to-vehicle communication apparatus. This has the advantage that the driver of the second motor vehicle, i.e., the wrong-way driver himself, can be warned or other road users can be made aware of the possible hazardous situation.

Furthermore, the warning message can be additionally or alternatively output to a central location by means of a vehicle-to-infrastructure communication apparatus, for example, a traffic management center. By this means the highest possible number of road users can be advantageously warned of the second motor vehicle traveling in the wrong direction of travel.

In a further embodiment of the method, the determination of the lane of the roadway in which the first motor vehicle is located includes a determination of boundary markings of the lanes of the roadway. This enables a simple and reliable determination of the lane.

In a further embodiment, it is additionally determined whether a changed traffic management system exists on the roadway in the area of the first motor vehicle, i.e., in the neighborhood of the first motor vehicle. In the said embodiment, the output of the warning message and/or the automatic actuation of the at least one apparatus of the first motor vehicle takes place if a second motor vehicle is determined by means of the first determination apparatus and optionally by means of the second determination apparatus and if no changed traffic management system exists on the roadway.

Here and subsequently, a changed traffic management system on the roadway is understood to mean that the traffic management system on the roadway differs from a predetermined traffic management system. Accordingly, no changed traffic management system on the roadway means that the traffic management system corresponds to the predetermined traffic management system. The said embodiment starts from the consideration that due to a changed traffic management system for example, in the form of a shift of the roadway due to road works, vehicles are traveling in a lane which is normally driven in the opposite direction. The said embodiment of the method advantageously enables the output of an incorrect warning message or an incorrect automatic evasion to be avoided.

The application additionally relates to a motor vehicle comprising a third determination apparatus. The third determination apparatus is configured to determine data of a roadway in an area of the motor vehicle, where the determination of the data includes a determination of a number n of lanes of the roadway. In addition, the motor vehicle has a determination unit comprising at least one optical camera, where the determination unit is configured to determine a lane of the roadway in which the motor vehicle is located, by means of data of the at least one optical camera, in particular if it is determined that n≥2. Furthermore, the motor vehicle has a first determination apparatus configured to determine whether a second motor vehicle is traveling in the lane in which the motor vehicle is located, in a second direction of travel opposite the first direction of travel of the motor vehicle. In addition, the motor vehicle has an output apparatus configured to output a warning message if such a second motor vehicle is determined and/or an actuating apparatus configured to automatically actuate at least one apparatus of the motor vehicle selected from the group consisting of a braking apparatus, a drive apparatus, and a steering apparatus, if such a second motor vehicle is determined.

The motor vehicle has the advantages already specified in connection with the method according to the application, which are not listed again at this point to avoid repetitions.

The third determination apparatus is preferably configured to determine the number n of lanes of the roadway in the first direction of travel and the motor vehicle is preferably an automobile or a truck.

A computer program product is provided that, when it is executed on a processing unit of a first motor vehicle, instructs the processing unit to execute the following steps. The processing unit is instructed to determine data of a roadway in an area of the first motor vehicle, wherein the determination of the data includes determining a number n of lanes of the roadway. If it is determined that n≥2, the processing unit is instructed to determine a lane of the roadway in which the first vehicle is located, by means of data of at least one optical camera of the first motor vehicle. Furthermore, the processing unit is instructed to determine whether a second motor vehicle is traveling in the lane in which the first motor vehicle is located, in a direction of travel opposite the first direction of travel, by means of a first determination apparatus of the first motor vehicle. If a second motor vehicle is determined, the processing unit is instructed to output a warning message and/or to automatically actuate at least one apparatus of the first motor vehicle, selected from the group consisting of a braking apparatus, a drive apparatus, and a steering apparatus.

A computer-readable medium is provided on which a computer program product according to the said embodiment is stored. The computer program product and the computer-readable medium have the advantages already specified in connection with the method, which are not listed again at this point to avoid repetitions.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
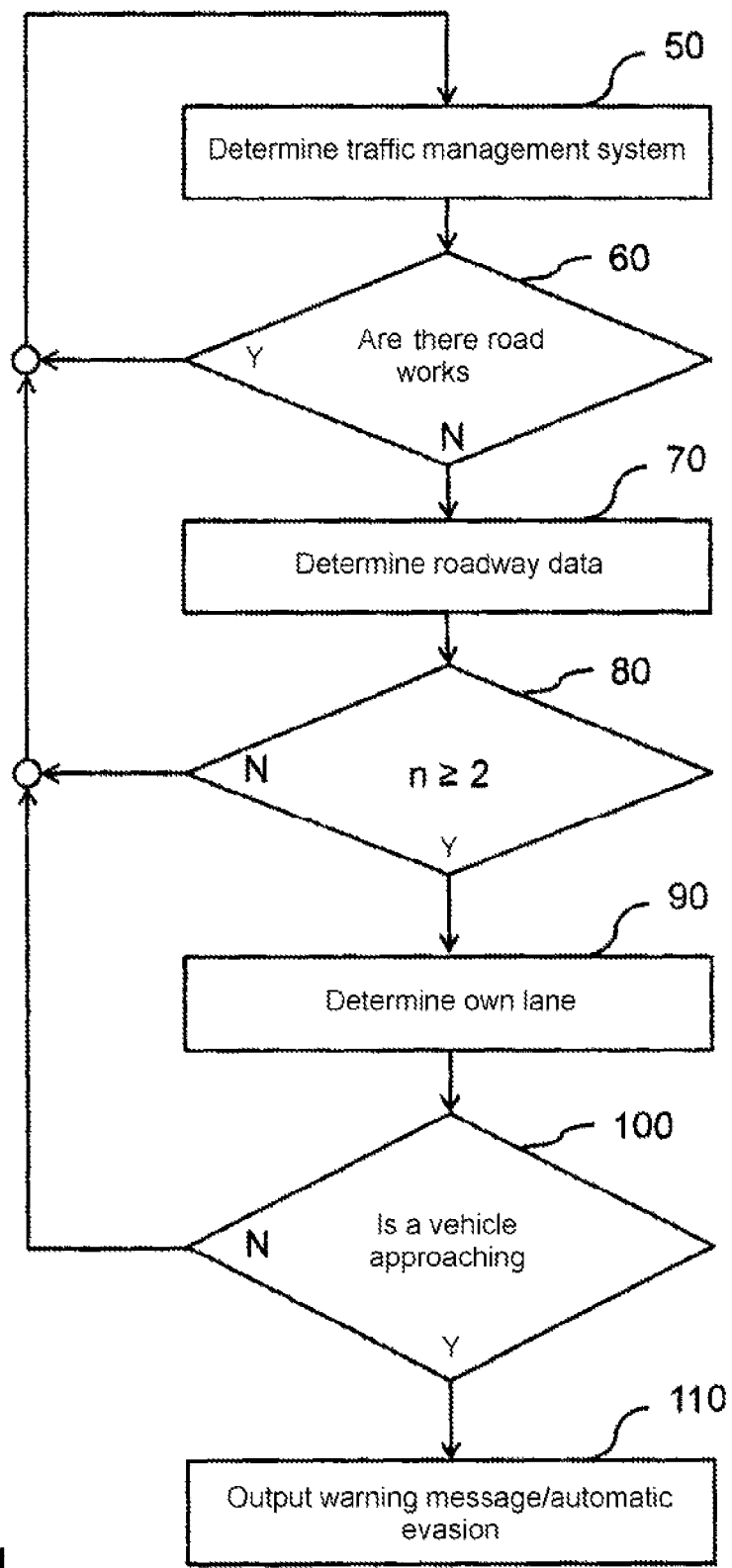
FIG. 1 shows a flow diagram of a method for operating a first motor vehicle traveling on a roadway in a first direction of travel according to one embodiment.

FIG. 1 shows a flow diagram of a method for operating a first vehicle traveling on a roadway in a first direction of travel according to one embodiment of the application. The first motor vehicle in this case is, for example, an automobile or a truck.

In a step 50 the instantaneous traffic management system on the roadway is determined in the area of the first motor vehicle. In the embodiment shown this is accomplished by means of data from at least one optical camera of the first motor vehicle. In step 60 it is checked by means of the determined data whether a changed traffic management system exists in the area of the first motor vehicle. To this end it is determined in the embodiment shown whether road works on the roadway are located in front of the first motor vehicle. The determination as to whether there are road works can be made, for example, by identifying road works signs or a narrowing of road markings in the images taken by the optical camera. If it is determined that road works exist in the area of the first motor vehicle, step 50 is executed repeatedly.

If, on the other hand, it is determined that no road works exist and therefore there is no changed traffic management system in the area of the first motor vehicle, data of the roadway in the area of the first motor vehicle are determined in a step 70, where the determination of the data includes determining the number n of lanes of the roadway. In the embodiment shown, the number n of lanes of the roadway is determined in the first direction of travel, i.e., in the direction of travel of the first motor vehicle. The roadway data is preferably determined by means of data of the at least one optical camera and/or by means of map data stored in a storage apparatus, for example, by means of map data of a navigation system of the first motor vehicle.

In a step 80 it is checked whether the number n of lanes of the roadway is at least two, i.e. whether the relationship n≥2 applies. If this relationship is not satisfied, steps 50, 60, and optionally 70 are executed repeatedly. If this relationship is satisfied, i.e. the number n of lanes of the roadway in the first direction of travel is at least two and therefore a freeway or a highway is typically identified, the lane of the roadway in which the first motor vehicle is located is determined in a step 90. The lane of the roadway is determined in this case by means of data of the at least one optical camera of the first motor vehicle, typically by determined boundary markings of the lanes of the roadway in the images recorded by the optical camera. A vehicle's own sensor is therefore used for the determination, whereby the instantaneous traffic situation can advantageously always be taken into account.

In a step 100 it is determined whether a second motor vehicle is traveling in the lane in which the first motor vehicle is located in a second direction of travel opposite the first direction of travel. In this case, it is determined whether the second motor vehicle is located in front of the first motor vehicle in the first direction of travel, i.e., whether the second motor vehicle is coming toward the first motor vehicle. The first direction of travel and the second direction of travel are in this case each relative to the roadway, i.e. a stationary object.

In the embodiment shown, the determination as to whether a second motor vehicle is coming toward the first motor vehicle is made by means of data of the at least one optical camera and by means of data of at least one further sensor, preferably by means of data of a radar sensor of the first motor vehicle. To this end the determined sensor data is fusioned and made plausible.

For example, it is determined whether in the images recorded by the optical camera, a rearward region, i.e., a rear region or a front-side region, i.e. a frontal region, of another motor vehicle can be identified. In addition, an approach of the second motor vehicle is determined by determining the speed of the second motor vehicle by means of data from the radar sensor. This is preferably accomplished by determining the speed of the first motor vehicle and the relative speed of the second motor vehicle, relative to the first motor vehicle.

If it is determined after fusioning and making the data plausible that no motor vehicle is coming toward the first motor vehicle, steps 50, 60, and optionally 70 to 100 are executed repeatedly. If, on the other hand, it is determined that a second motor vehicle is coming toward the first motor vehicle in its own lane, i.e., the optical camera and the radar system identify an approaching vehicle, in a step 110 a warning is issued to the occupants of the first motor vehicle, in particular the driver of the first motor vehicle. The warning message is typically output as a visual and/or audible and/or haptic warning message. Additionally or alternatively an automatic evasion of the first motor vehicle can be executed. This is accomplished by means of automatic actuation of at least one apparatus of the first motor vehicle, selected from the group consisting of a braking apparatus, a drive apparatus, and a steering apparatus.

In addition, the information relating to an approaching motor vehicle can be transferred by means of a vehicle-to-vehicle communication apparatus and/or a vehicle-to-infrastructure communication apparatus to other vehicles or to a traffic control center. In addition, this information can be transferred by means of other communication means to other vehicles, in particular to a second motor vehicle, for example, by means of automatic actuation of a horn and/or at least one light signal device, typically at least one headlamp or a warning flashing light, of the first motor vehicle.

The method according to the said embodiment, as already explained, advantageously allows road works to be identified in the area of the first motor vehicle and as a result, allows this scenario to be taken into account. By this means incorrect warnings caused by roadway shifts within the road works can be avoided.

Figure 2:
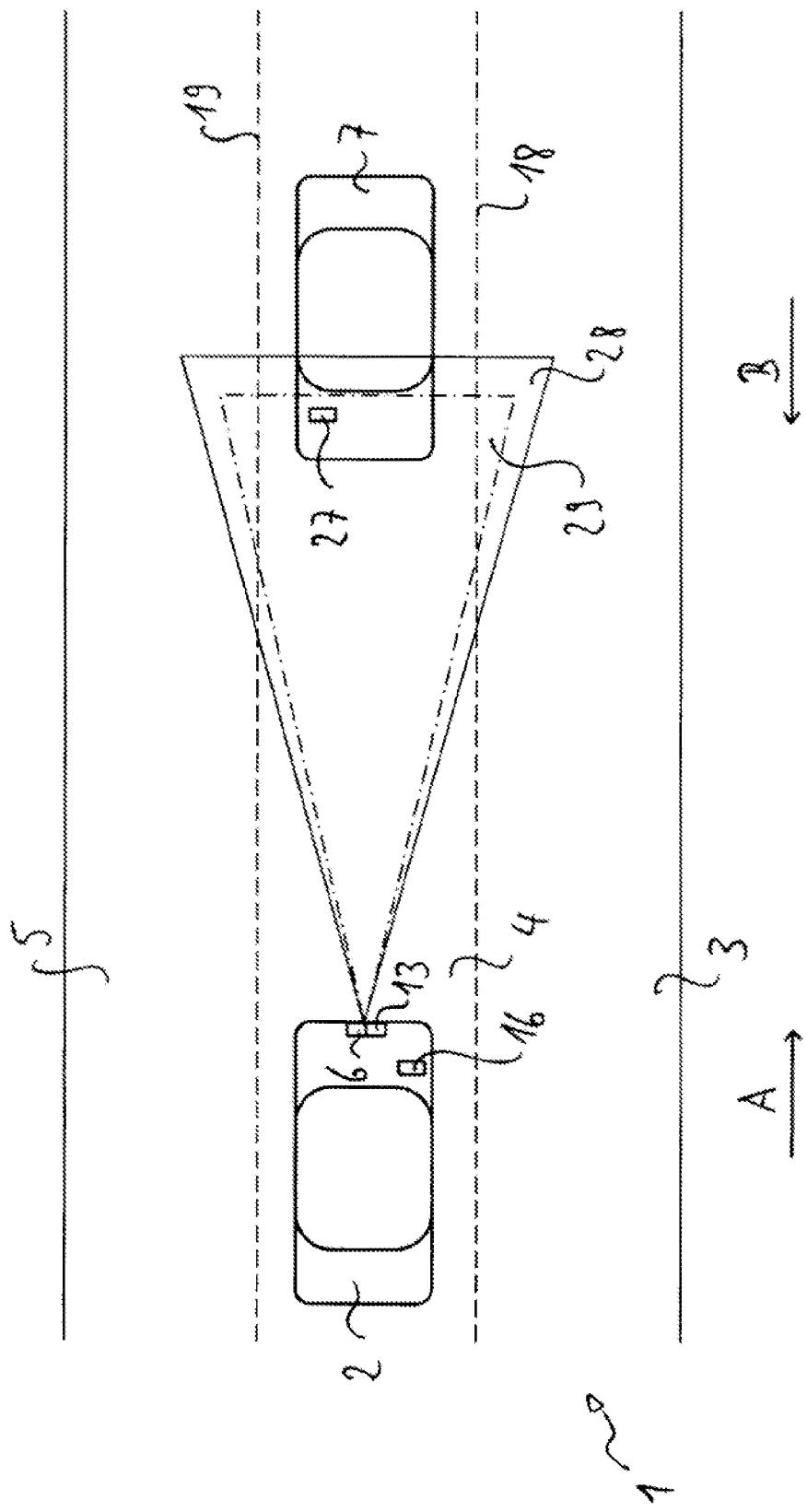
FIG. 2 shows a motor vehicle according to one embodiment.

FIG. 2 shows a first motor vehicle 2 according to one embodiment. In the embodiment shown the first motor vehicle 2 is an automobile and is traveling on a roadway 1 in a first direction of travel shown schematically by means of an arrow A. In the embodiment shown the roadway 1 forms a part of a freeway and has lanes 3, 4, and 5 in the first direction of travel. The first motor vehicle 2 is located in this case in the central lane 4. Furthermore, a second motor vehicle 7, which is traveling toward the first motor vehicle 2 in a second direction of travel opposite the first direction of travel, depicted schematically by means of an arrow B, is located in the central lane 4. In addition, boundary markings 18 and 19 of the central lane 4 are shown in FIG. 2.

The first motor vehicle 2 has an optical camera 6 and another sensor 13, for example, a radar sensor, which are each disposed in a front-side area of the first motor vehicle 2. The optical camera 6 has a detection range 29 shown schematically by means of a dot-dash line and the sensor 13 has a detection range 28 shown schematically by means of a continuous line.

If the second motor vehicle 7, as shown in FIG. 2, is located at least partially inside the detection area 28 and the detection area 29, it is identified by the two sensors. In the embodiment shown a warning message is output inside the first motor vehicle 2, and the warning message is transmitted by means of a vehicle-to-vehicle communication apparatus 16 of the first motor vehicle 2 to the second motor vehicle 7 that also has a vehicle-to-vehicle communication apparatus 27. Further details are explained in detail in connection with the following figure.

Figure 3:
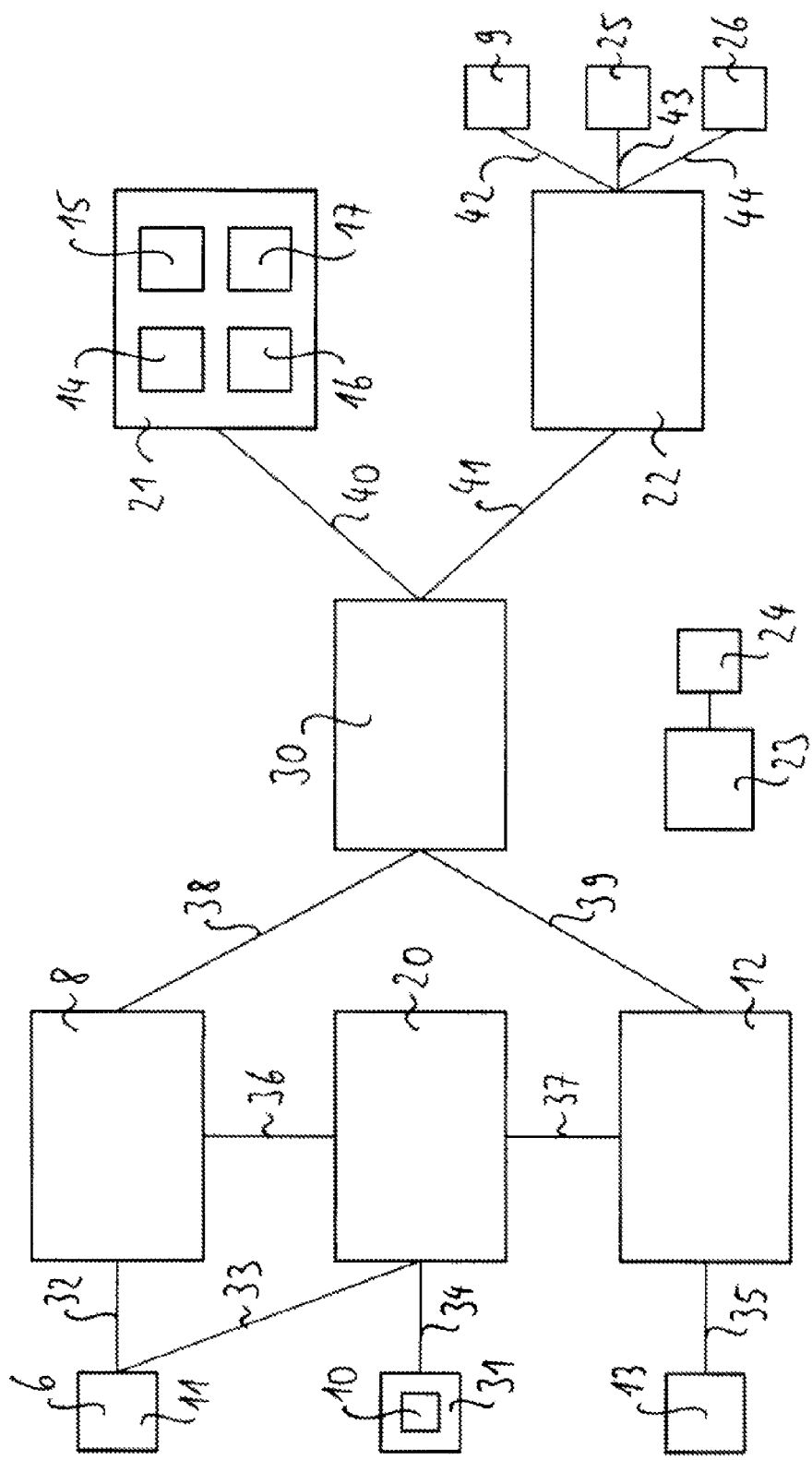
FIG. 3 shows components of the motor vehicle according to FIG. 2.

FIG. 3 shows components of the first motor vehicle according to FIG. 2. Components having the same functions as in FIG. 2 are characterized by the same reference numbers and not explained in detail hereinafter. The first motor vehicle not shown in detail in FIG. 3 has a third determination apparatus 20, which is configured to determine data of the roadway in an area of the first motor vehicle, where the determination of the data includes determining a number n of lanes of the roadway. In the embodiment shown, the third determination apparatus 20 is connected via a signal line 33 to the optical camera 6 and via a signal line 34 to a navigation system 31 of the first motor vehicle that has a storage apparatus 10 with map data stored thereon.

In the embodiment shown, the third determination apparatus 20 additionally forms a determination unit, which is configured to determine that lane of the roadway in which the first motor vehicle is located, by means of data of the optical camera 6, for example, by determining boundary markings of the lane in the images recorded by the optical camera 6. In addition, the first motor vehicle has a first determination apparatus 8 which is configured to determine whether a second motor vehicle is located in the second direction of travel in the lane in which the first motor vehicle is located. To this end, the first determination apparatus 8 is connected via a signal line 32 to the optical camera 6, which forms a first sensor 11.

Furthermore, the first motor vehicle has a second determination apparatus 12 which is also configured to determine whether a second motor vehicle is traveling in the second direction of travel in the lane in which the first motor is located. To this end, in the embodiment shown the second determination apparatus 12 is connected via a signal line 35 to the second sensor 13. Furthermore, the first determination apparatus 8 is connected via a signal line 36 and the second determination apparatus 12 is connected via a signal line 37 to the third determination apparatus 20. In addition, the first determination apparatus 8 is connected via a signal line 38 and the second determination apparatus 12 is connected via a signal line 39 to a data fusion apparatus 30 of the first motor vehicle. The data fusion apparatus 30 is configured for fusioning and making plausible the data of the first determination apparatus 8 and the second determination apparatus 12. If, after the sensor data has been fusioned and made plausible, it is determined that a second motor vehicle is approaching the first motor vehicle in the same lane, in the embodiment shown a warning message is output by means of an output apparatus 21 of the first motor vehicle. To this end the output apparatus 21 is connected via a signal line 40 to the data fusion apparatus 30.

The warning message is preferably output inside the first motor vehicle. As a result, the occupants of the first motor vehicle, for example, the driver of the first motor vehicle, can be warned of vehicles traveling in its own lane in the wrong direction of travel, in particular of approaching vehicles. Additionally or alternatively, the warning message can be output or transmitted to other road users, in particular to the second motor vehicle. To this end, the output apparatus 21 is configured for automatic actuation of a horn 14 and a light signaling device 15 of the first motor vehicle. In this case, the light signaling device at least includes a headlamp or a warning flashing light. Furthermore, the output apparatus 21 is configured for outputting the warning message by means of the vehicle-to-vehicle communication apparatus 16 and a vehicle-to-infrastructure communication apparatus 17.

Furthermore, after an approaching motor vehicle has been identified, additionally or alternatively an automatic evasion can be accomplished by means of an actuating apparatus 22 of the first motor vehicle. To this end, the actuating apparatus 22 is connected via a signal line 41 to the data fusion apparatus 30 and via a control line 42 to a braking apparatus 9, via a control line 43 to a drive apparatus 25, and via a control line 44 to a steering apparatus 26 of the first motor vehicle.

In the embodiment shown the first motor vehicle further comprises a processing unit 23 and a computer-readable medium 24, where a computer program product is stored on the computer-readable medium 24 which, when executed on the processing unit 23, instructs the processing unit 23 to execute the said steps of the method according to the application, in particular the embodiment shown in FIG. 1, by means of the said elements. To this end, the processing unit 23 is connected in a manner not shown in detail directly or indirectly to the said components.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A method for operating a first motor vehicle traveling on a roadway in a first direction of travel, comprising:
   determining, by a processor, data of the roadway in an area of the first motor vehicle, the determining comprises determining a number of lanes of the roadway;
   determining, by a processor, a lane of the roadway in which the first motor vehicle is located with a least one optical camera of the first motor vehicle if the number of lanes is ≥2;
   determining, by a processor, whether a second motor vehicle is traveling in the lane in which the first motor vehicle is located in a direction of travel opposite the first direction of travel with a first determination apparatus of the first motor vehicle; and
   performing an action if the second motor vehicle is traveling in the lane in which the first motor vehicle is located in the direction of travel opposite the first direction of travel.

2. The method according to claim 1, wherein the action comprises generating a warning message.

3. The method according to claim 1, wherein the action comprises an automatic actuation of an apparatus of the first motor vehicle.

4. The method according to claim 3, wherein the apparatus is a braking apparatus.

5. The method according to claim 3, wherein the apparatus is a drive apparatus.

6. The method according to claim 3, wherein the apparatus is a steering apparatus.

7. The method according to claim 1, further comprising determining the number of lanes of the roadway in the first direction of travel.

8. The method according to claim 1, wherein the determining data of the roadway in the area of the first motor vehicle is made with data of an optical camera.

9. The method according to claim 1, wherein the determining data of the roadway in the area of the first motor vehicle is made with data of map data stored in a storage apparatus.

10. The method according to claim 1, wherein the first determination apparatus includes a sensor.

11. The method according to claim 10, wherein the sensor is an electromagnetic sensor.

12. The method according to claim 1, further comprising:
determining with a second determination apparatus of the first motor vehicle whether the second motor vehicle is traveling in a second direction of travel in the lane in which the first motor vehicle is located,
wherein the performing the action is conducted if the second motor vehicle is determined with the first determination apparatus and the second determination apparatus.

13. The method according to claim 12, wherein the second determination apparatus comprises an acoustic sensor.

14. A motor vehicle, comprising:
a third determination apparatus configured to determine data of a roadway in an area of the motor vehicle that comprises a number of lanes of the roadway;
a determination unit comprising an optical camera configured to determine a lane of the roadway in which the motor vehicle is located with data of optical camera if the number of lanes is ≥2;
a first determination apparatus configured to determine whether a second motor vehicle is traveling in the lane in which the motor vehicle is located in a second direction of travel opposite a first direction of travel of the motor vehicle; and
an apparatus configured to perform an action if the second motor vehicle is traveling is traveling in the lane in which a first motor vehicle is located in a direction of travel opposite the first direction of travel.

15. The motor vehicle according to claim 14, wherein the apparatus is a warning apparatus that is configured to generate a warning message.

16. The motor vehicle according to claim 14, wherein the apparatus is an actuating apparatus that is configured to automatically actuate a braking apparatus.

17. The motor vehicle according to claim 14, wherein the apparatus is an actuating apparatus that is configured to automatically actuate a steering apparatus.

18. The motor vehicle according to claim 14, wherein the third determination apparatus is configured to determine the number of lanes of the roadway in the first direction of travel.

19. A non-transitory computer readable medium embodying a computer program product, said computer program product comprising:
an operating program for operating a first motor vehicle traveling on a roadway in a first direction of travel, the operating program configured to:
determine data of the roadway in an area of the first motor vehicle, the determining comprises determining a number of lanes of the roadway;
determine a lane of the roadway in which the first motor vehicle is located with a least one optical camera of the first motor vehicle if the number of lanes is ≥2;
determine whether a second motor vehicle is traveling in the lane in which the first motor vehicle is located in a direction of travel opposite the first direction of travel with a first determination apparatus of the first motor vehicle; and
perform an action if the second motor vehicle is traveling is traveling in the lane in which the first motor vehicle is located in the direction of travel opposite the first direction of travel.

20. The non-transitory computer readable medium embodying the computer program product according to claim 19, wherein the action comprises generating a warning message.

21. The non-transitory computer readable medium embodying the computer program product according to claim 19, wherein the action comprises an automatic actuation of an apparatus of the first motor vehicle.

* * * * *